United States Patent
Svendsen et al.

(10) Patent No.: US 6,842,842 B2
(45) Date of Patent: Jan. 11, 2005

(54) METHOD AND SYSTEM TO PREPROGRAM AND PREDICT A NEXT MICROCODE ADDRESS

(75) Inventors: Kjeld Svendsen, Santa Clara, CA (US); John Alan Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 10/046,963

(22) Filed: Jan. 11, 2002

(65) Prior Publication Data

US 2002/0144102 A1 Oct. 3, 2002

(51) Int. Cl.⁷ .............................. G06F 9/26; G06F 12/02
(52) U.S. Cl. ...................... 711/204; 711/103; 712/239; 712/243
(58) Field of Search ................................. 711/102, 103, 711/204, 205, 213; 712/207, 237, 238, 239, 243

(56) References Cited

U.S. PATENT DOCUMENTS 4,430,706 A * 2/1984 Sand .......................... 712/237
6,493,821 B1 * 12/2002 D'Sa et al. .................. 712/239

* cited by examiner

*Primary Examiner*—Gary Portka
(74) *Attorney, Agent, or Firm*—Blakely, Sokoloff, Taylor & Zafman LLP

(57) ABSTRACT

A microprocessor includes a first memory to store microcode and a second memory to store predicted micro-operation addresses. Micro-operation addresses are predicted, stored in memory, and retrieved to get the next micro-operations from the microcode memory. Misprediction recovery logic is used to determine if the next predicted address is correct and to determine a recovery address to correct the predicted address if the predicted address is incorrect.

11 Claims, 3 Drawing Sheets

METHOD AND SYSTEM TO PREPROGRAM AND PREDICT A NEXT MICROCODE ADDRESS

BACKGROUND OF THE INVENTION

1. Field of the Invention

The present invention relates to the field of micro-code branch prediction. In particular, the present invention relates to preprogramming and predicting the address of the next microcode instruction to be executed.

2. Description of Related Art

Predicting branches in micro-code increases performance of the microprocessor. Branch prediction involves determining the next address to look up and then using that address to access the read-only memory (ROM) where the microcode instruction is stored. Various methods are used to determine the next address to look-up in the micro-code ROM. In any case, after the next address is determined, the micro-code ROM is accessed at that address to get the micro-operations (uops). Therefore, no matter how the address determination logic is improved to decrease the time for an address look-up, performance is still limited by the access time of the ROM. As the size of the micro-code increases, the access time of the ROM increases. As clock frequencies increase, it may take more than one clock cycle to access the micro-code ROM, which causes the instruction pipeline to stall while waiting for the next uops. Therefore, as processors utilize a larger micro-code and clock frequencies increase, limiting performance of a look-up to the access time of the micro-code ROM becomes an increasing problem.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION OF THE INVENTION

Embodiments of a system and method for preprogramming and predicting the next microcode address are described. In the following description, numerous specific details are provided, for a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
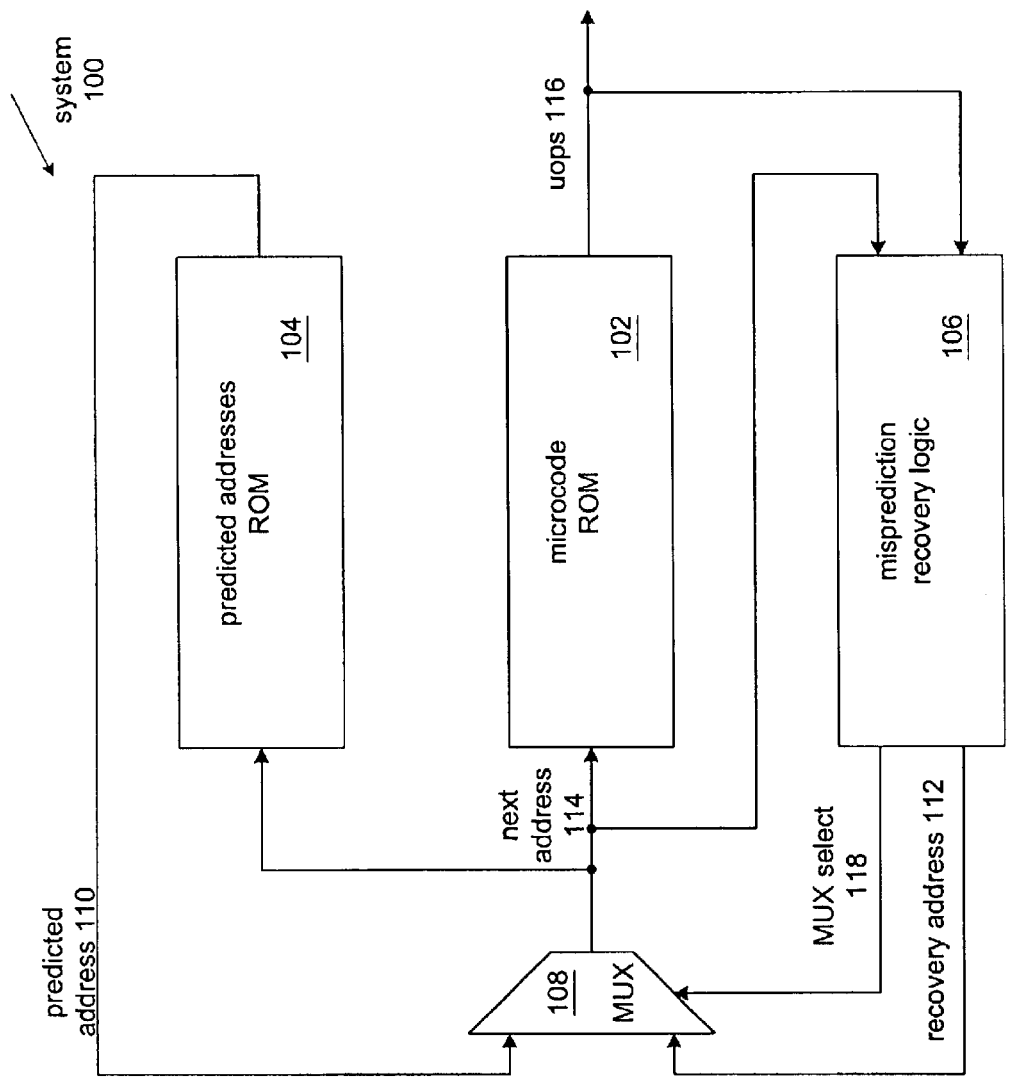
FIG. 1 is a block diagram illustrating one embodiment of the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention. System 100 includes a memory to store microcode 102, a memory to store predicted addresses 104, misprediction recovery logic 106, and a selector 108. In one embodiment, the selector 108 is a multiplexer (MUX). In one embodiment, the memory to store microcode 102 is a read-only memory (ROM). The microcode memory 102 stores micro-operations (uops). When the memory 102 is accessed at a next address 114, it will output the uops 116 stored at that address line. There may be one or more uops stored at an address line. The uops 116 output from the microcode memory 102 may be used in an instruction pipeline in a microprocessor. In one embodiment, the uops are stored in a register to be used in the instruction pipeline.

Addresses that will be used to access the microcode memory 102 are predicted and then stored in memory 104. In one embodiment, the addresses are predicted based on the uops in the microcode. In one embodiment, the memory 104 is a ROM. When uops are needed by the instruction pipeline, they are retrieved by accessing the microcode memory 102 at the addresses retrieved from the predicted addresses memory 104. Misprediction recovery logic 106 is used to determine if the predicted address 110 retrieved from memory 104 is a correct next address at which to access the microcode memory 102. If the predicted address 110 is correct, the misprediction recovery logic 106 will output a MUX select 118 that selects the predicted address 110 as the next address 114 at which to access the microcode memory 102. If the misprediction recovery logic 106 determines that the predicted address 110 is incorrect, then it will correct the predicted address by determining a recovery address 112 and outputting a MUX select 118 that selects the recovery address 112 as the next address 114 at which to access the microcode memory 102. For example, the misprediction recovery logic may output a MUX select of 0 when the predicted address is correct and output a MUX select of 1 when the predicted address is incorrect. Therefore, MUX 108 will select the predicted address as the next address when the MUX select is 0. With a MUX select of 1, MUX 108 will select the recovery address as the next address.

Figure 2:
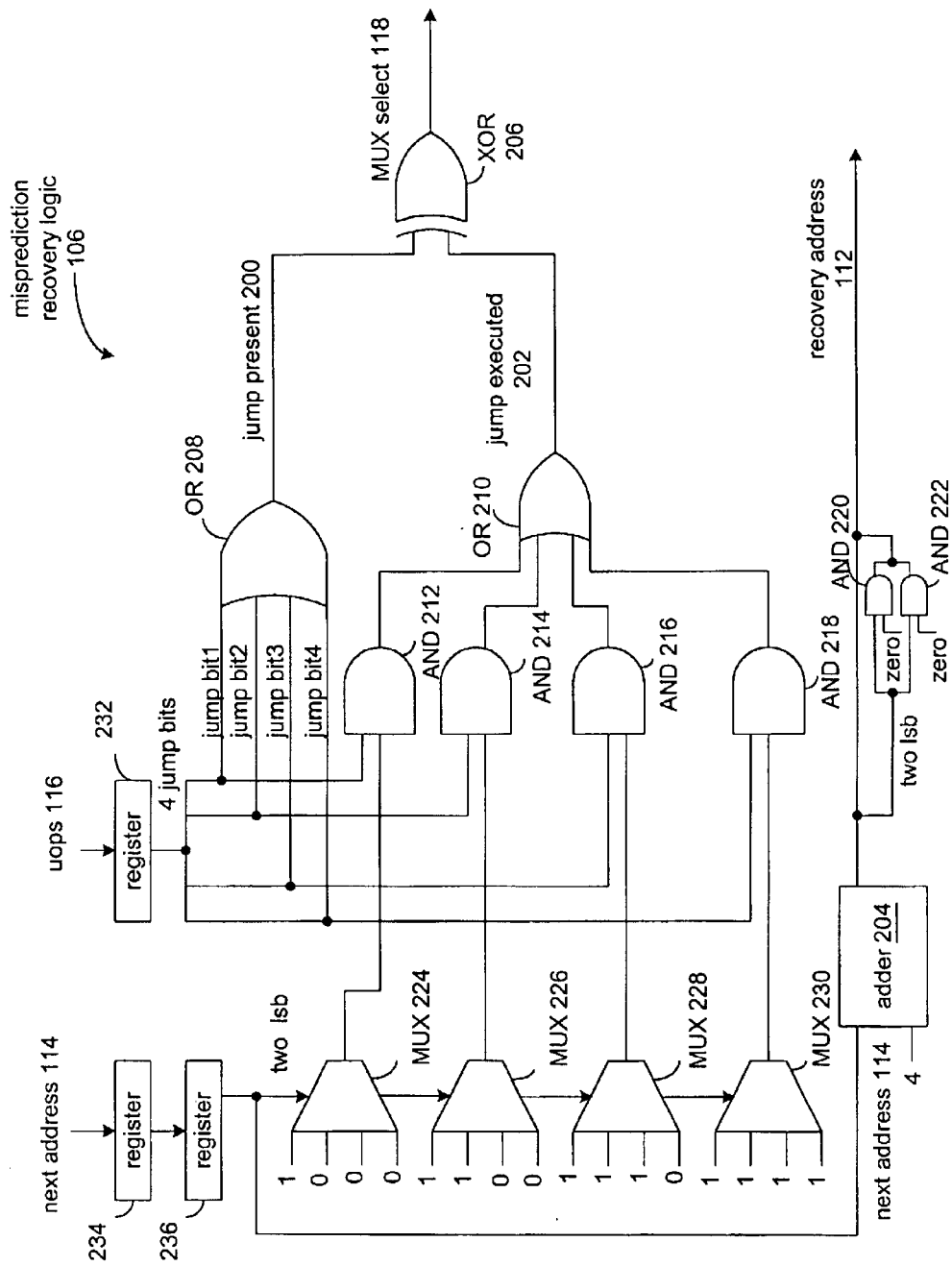
FIG. 2 illustrates an example implementation of the misprediction recovery logic according to one embodiment of the invention.

Referring to FIG. 2, an example implementation of the misprediction recovery logic 106 according to one embodiment of the invention is illustrated. The misprediction recovery logic 106 has two inputs: the next address 114 and the uops 116. The misprediction recovery logic 106 has two outputs: the recovery address 112 and the MUX select 118. The MUX select 118 indicates whether the predicted address 110 is correct and if so, selects the predicted address 110 as the next address 114 at which to access the microcode ROM 102. The recovery address 112 is used as the next address to access the microcode ROM 102 when the predicted address 110 is determined to be incorrect.

To determine whether the predicted address 110 is correct, the misprediction recovery logic 106 compares whether there is a jump present and whether a jump was executed. In one embodiment, each uop has a plurality of bits, including a jump bit. The jump bit indicates whether the uop is a jump. For example, the jump bit may be a 1 when the uop is a jump and a 0 when the uop is not a jump. In the example shown, there are four uops stored at each address line in the microcode memory 102, and each uop includes one jump bit. Therefore, there are a total of four jump bits. In one embodiment, the uops 116 are stored in a register 232 to be used by the misprediction recovery logic 106. In the example shown, the four jump bits are input into an OR gate 208 to determine if there is a jump present 200.

In one embodiment, the next address 114 is stored in registers 234 and 236 for use by the misprediction recovery logic 106. The next address 114 has a plurality of bits. The two least significant bits (lsb) of the next address are used as the selector for four MUXes 224, 226, 228, and 230. The inputs to MUX 224 are 1, 0, 0, 0. The inputs to MUX 226 are 1, 1, 0, 0. The inputs to MUX 228 are 1, 1, 1, 0. The inputs to MUX 230 are 1, 1, 1, 1.

The following table shows the output of each of the four MUXes based on the selector, which is the two least significant bits (lsb) of the next address:

| Selector | MUX 224 output | MUX 226 output | MUX 228 output | MUX 230 output |
|---|---|---|---|---|
| 00 | 1 | 1 | 1 | 1 |
| 01 | 0 | 1 | 1 | 1 |
| 10 | 0 | 0 | 1 | 1 |
| 11 | 0 | 0 | 0 | 1 |

The output of each of the four MUXes 224, 226, 228, and 230 is one of the inputs to each of four AND gates 212, 214, 216, and 218 respectively. Since the output of MUX 230 is always a 1, the MUX 230 may be eliminated and replaced by wiring an input of 1 to AND gate 218. Each MUX output is ANDed together with one of the four jump bits of the uops 116. In the example shown, the output of MUX 224 and the jump bit of the first uop (jump bit1) is input into AND gate 212. Likewise, the output of MUX 226 and the jump bit of the second uop (jump bit2) is input into AND gate 214, the output of MUX 228 and the jump bit of the third uop (jump bit3) is input into AND gate 216, and the output of MUX 230 and the jump bit of the fourth uop (jump bit4) is input into AND gate 218. The outputs of the four AND gates 212, 214, 216, and 218 are input into an OR gate 210 to determine if there was a jump executed 202. The jump present 200 and jump executed 202 are then compared to determine if the predicted address 110 is correct. In one embodiment, the jump present 200 and the jump executed 202 are compared using a XOR gate 206. The output of the XOR gate 206 is the MUX select 118 that will select the predicted address 110 as the next address if the predicted address 110 is correct and will select the recovery address 112 as the next address if the predicted address 110 is incorrect. In the example shown, the XOR gate 206 will output a 0 when the jump present 200 and the jump executed 202 have the same value, which indicates that the predicted address is correct. When the predicted address is incorrect, the jump present 200 and the jump executed 202 will have different values, and the XOR gate 206 will output a 1.

The recovery address 112 is determined using the next address 114. The next address 114 is input into an adder 204. The adder 204 adds the next address 114 to the number of uops per address line. In the example implementation, there are four uops stored at an address line in microcode memory 102. Therefore, the adder 204 adds 4 to the next address 114. Then, the two least significant bits (lsb) of the address are zeroed out. In one embodiment, the two lsb are zeroed out by ANDing each bit with a zero using two AND gates 220 and 222. After the number of uops per line is added to the next address 114 and the two lsb are zeroed out, the result is a recovery address 112 that will be used as the next address at which to access the microcode memory 102 if the predicted address 110 is determined to be incorrect.

Figure 3:
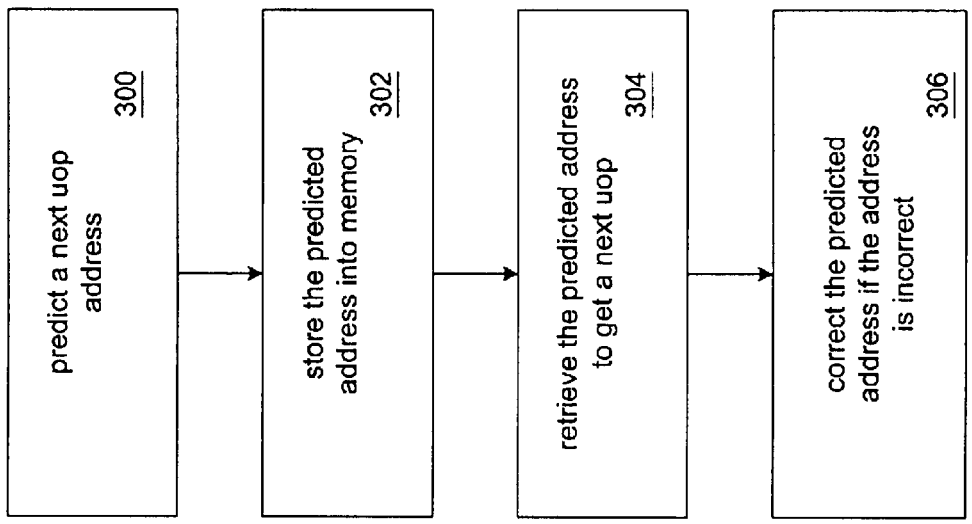
FIG. 3 is a flow chart illustrating an embodiment of the invention.

Referring to FIG. 3, a flow chart illustrating one embodiment of the method of the invention is provided. The method begins at step 300, where a next uop address is predicted. Then, the method continues to step 302, where the predicted address is stored into memory. In one embodiment, the predicted address is pre-programmed into a ROM. Then, the method continues to step 304, where the predicted address is retrieved from memory and used to obtain the next uops. Then, the method continues to step 306, where the predicted address is corrected if the address was mispredicted.

An illustrative example of the method according to the invention will now be described. For purposes of illustration, assume that the microcode ROM has the following data: at address 0, the uops in the address line are add, add, add, add; at address 4, the uops in the address line are jump to 9, add, add, add; at address 8, the uops in the address line are jump to 0, add, add, add; and at address 12, the uops in the address line are add, add, add, add. Based on the uops in the microcode, the predicted addresses are as follows: at address 0, the predicted next address is 4; at address 4, the predicted next address is 9 (since there is a uop that is a jump to 9); at address 8, the predicted next address is 0 (since there is a uop that is a jump to 0); and at address 12, the predicted next address is 16.

On the first cycle, the microcode ROM is accessed at address 0 and the uops read out of the ROM at that address line are add, add, add, add. Since none of the uops are jumps, the jump bits are all zero. Therefore, the jump present and the jump executed are both zero, and the MUX select is zero. With a MUX select of zero, the MUX 108 selects the predicted address, which is 4, as the next address.

At address 4, the uops read out of the microcode ROM at that address line are jump to 9, add, add, add. Since the first uop is a jump, its jump bit is 1. The other three uops are adds, so their jump bits are all 0. When the four jump bits are input into OR gate 208, the output is a 1, so the jump present 200 is equal to 1. The two least significant bits of the next address are 00. With a selector of 00, the four MUXes 224, 226, 228, and 230 will all output 1. When the jump bit of 1 from the first uop and the output 1 from MUX 224 is input into AND gate 212, the output is 1. Therefore, the output of the OR gate 210 is a 1, so the jump executed 202 is 1. Since the jump present and jump executed are both 1, the MUX select is 0, and the predicted address of 9 is selected as the next address.

At address 9, the uops read out of the microcode ROM at that address line are jump to 0, add, add, add. Since the first uop is a jump, the first jump bit is a 1. The other three uops are not jumps, so their jump bits are 0. Therefore, the jump present 200 is 1. Since the address is 9, the two least significant bits of the address are 01. With a selector of 1, MUX 224 will output a 0 and the other three MUXes (226, 228, and 230) will each output a 1. When the MUX 224 output of 0 and the first jump bit of 1 is input into AND 212, the output is 0. When the MUX 226 output of 1 and the second jump bit of 0 is input into AND 214, the output is 0. Likewise, when the MUX 228 output of 1 and the third jump bit of 0 is input into AND 216, the output is 0, and when the MUX 230 output of 1 and the fourth jump bit of 0 is input into AND 218, the output is 0. Therefore, the output of all four AND gates will be 0, so the jump executed 202 will be 0. Since the jump present 200 is 1 and jump executed 202 is 0, the MUX select is 1, and the recovery address is selected as the next address. The recovery address is the address 9 added with the number of uops per line (4) with the two least significant bits zeroed out, which is equal to 12. Therefore, the microcode ROM will be accessed at a next address of 12.

In one embodiment, registers are used to store the uops and the next address to be used in the misprediction recovery logic. There may be some latency in correcting the predicted address. Therefore, the microcode ROM may be accessed at the predicted address of 0, and it may take another cycle to correct the next address and access the microcode ROM at the correct next address of 12.

At address 12, the uops read out of the microcode ROM are add, add, add, add. Since there is no jump, all the jump bits are zero. Therefore, the jump present is zero and the jump executed is zero. The MUX select is 0, and the MUX 108 selects the predicted address of 16 as the next address at which to access the microcode ROM.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:

predicting a next micro-operation address;

storing the predicted address into a first memory;

retrieving the predicted address from the first memory;

accessing a second memory at the retrieved address to get a next micro-operation including a plurality of bits, wherein the next micro-operation indicates whether there is a jump present with at least two jump bits:

determining whether the micro-operation address is correctly predicted by checking the two least significant bits of the next micro-operation address to determine if a jump was executed; and correcting the predicted address if the address is mispredicted.

2. The method of claim 1, wherein storing the predicted address comprises programming the address into a read-only memory.

3. The method of claim 1, wherein correcting the predicted address comprises zeroing out the two least significant bits of the next micro-operation address.

4. The method of claim 1, further comprising storing the next micro-operation for use in an instruction pipeline.

5. The method of claim 4, wherein storing the next micro-operation comprises writing the micro-operation into a register.

6. A system comprising:

a first memory to store microcode, wherein the first memory is accessed at a next address to get a next micro-operation including at least two jump bits positioned as the two least significant bits of the next micro-operation;

a second memory to store predicted micro-operation addresses comprising a plurality of bits;

misprediction recovery logic coupled to the first memory to determine if the predicted address is correct and to determine a recovery address, the misprediction recovery logic to determine whether a jump was executed by checking the jump bits of the next micro-operation; and a selector coupled to the first memory, the second memory, and the misprediction recovery, to select either the predicted address or the recovery address as the next address at which to access the first memory based on the determination by the misprediction recovery logic as to whether the predicted address is correct.

7. The system of claim 6, wherein the misprediction recovery logic to determine the recovery address comprises the misprediction recovery logic to zero out the two least significant bits of the next address.

8. The system of claim 7, wherein the misprediction recovery logic to determine the recovery address further comprises the misprediction recovery logic to add the number of micro-operations per line to the next address.

9. The system of claim 6, further comprising a register coupled to the first memory to store the next micro-operation.

10. The system of claim 6, further comprising a register coupled to the first memory to store the next address for use by the misprediction recovery logic.

11. The system of claim 6, wherein the selector is a multiplexer.

* * * * *